United States Patent [19]

Matsuda

[11] 4,158,727
[45] Jun. 19, 1979

[54] METAL-CONTAINING CURABLE EPOXY RESIN COMPOSITIONS

[75] Inventor: Hideaki Matsuda, Kagawa, Japan

[73] Assignee: Okura Kogyo Kabushiki Kaisha, Kagawa, Japan

[21] Appl. No.: 848,385

[22] Filed: Nov. 4, 1977

[30] Foreign Application Priority Data

Nov. 11, 1976 [JP]  Japan ................................ 51-134644

[51] Int. Cl.$^2$ ........................................... C08G 59/42
[52] U.S. Cl. ..................................... 528/92; 528/115; 528/361; 528/365
[58] Field of Search ............ 260/47 EC, 2 EC, 78.41; 528/92, 115, 365, 361

[56] References Cited

U.S. PATENT DOCUMENTS

| | | | |
|---|---|---|---|
| 3,268,477 | 8/1966 | Mueller | 260/47 |
| 3,578,633 | 5/1971 | Rossa | 260/47 |
| 3,689,444 | 9/1972 | Wolfe | 260/18 EP |
| 3,692,715 | 9/1972 | Groff et al. | 260/18 EP |

*Primary Examiner*—Earl A. Nielsen
*Attorney, Agent, or Firm*—Jacobs & Jacobs

[57] ABSTRACT

Metal-containing self-curing epoxy resin compositions are provided, which can advantageously be employed as adhesives, casting resins, paints and the like. The compositions comprise (i) a metal-containing compound represented by the general formula;

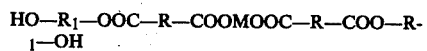

HO—$R_1$—OOC—R—COOMOOC—R—COO—$R_1$—OH (ii) a dibasic acid anhydride, and (iii) an epoxy resin.

5 Claims, No Drawings

METAL-CONTAINING CURABLE EPOXY RESIN COMPOSITIONS

BACKGROUND OF THE INVENTION (1) Field of the Invention

This invention relates to a metal-containing curable resin composition which is widely employed as adhesives, casting resins, paints and the like. More particularly, it relates to a metal-containing self-curing epoxy resin composition which comprises a metal-containing compound represented by the general formula;

$$HO-R_1-OOC-R-COOMOOC-R-COO-R_1-OH \quad [1]$$

(wherein, $R_1$ is the residue of a glycol, R is a residue of dibasic acid anhydride and M is a divalent metal), a dibasic acid anhydride and an epoxy resin.

(2) Description of the Prior Art

Epoxy resins have been widely employed as adhesives, casting resins, paints and the like, but addition of curing agents is required to effect curing of conventional epoxy resins. The addition of such curing agent to epoxy resins is troublesome, in that (a) the amount of curing agent to be added must be determined by measuring epoxy equivalent of the epoxy resin to be cured, (b) some curing agents are toxic. On the other hand, according to the present invention, a metal-containing compound represented by the general formula [1] described above participates in curing reaction as a component of the present composition to form a cured product as well as catalyzes the curing reaction without addition of the above-mentioned curing agent.

Heretofore, a method of introducing ionic bonds into polymer chains has been widely carried out in the art. The method comprises preparing a polymer containing carboxyl groups at the ends or sides of the polymer chain according to a conventional process and then neutralizing the carboxyl groups contained in the polymer with a metallic ion-forming agent. This method, however, has difficulty in that the neutralization reaction does not sufficiently proceed and the unreacted metallic ion-forming agent must be removed. Presence of the unreacted metallic ion-forming agent may result in opaqueness of the resulting polymer. Further, the neutralization reaction produces by-products such as water. Furthermore, according to the method, it is very difficult to introduce ionic bonds effectively into a three-dimensional polymer.

An object of the invention is to provide a novel curable resin composition which can be appropriately employed as adhesives, casting resins, paints and the like.

Other objects of the invention will be made clear in the following description.

Incidentally, the term "metal-containing" used herein means that the metal is contained via metal-ionic bond (ionic bond of metal) in the compound represented by the general formula [1] which is a main component of the present curable composition as well as in the resulting cured resin product.

SUMMARY OF THE INVENTION

In accordance with the present invention, there is provided a metal-containing curable resin composition which comprises an epoxy resin incorporated with (i) a metal-containing compound having metal-ionic bonds in its molecule represented by the following general formula [1];

$$HO-R_1-OOC-R-COOMOOC-R-COO-R_1-OH$$

wherein, $R_1$ stands for the residue of a glycol, R stands for the residue of a dibasic acid anhydride in which the acid anhydride group was removed anhydride from the anhydride, and M is a divalent metal, and (ii) a dibasic acid anhydride.

The marked effects attained by the curable resin composition of the present invention are characterized in that (a) the composition is self-curing and its curing reaction proceeds rapidly at a temperature of preferably from about 60° to about 150° C. without adding a conventional esterification catalyst; and (b) the resulting cured composition exhibits very strong bonding strength, especially when the composition is employed as adhesives.

DETAILED DESCRIPTION OF THE INVENTION

The present self-curing resin compositions comprising a metal-containing compound represented by the general formula [1] mentioned above, a dibasic acid anhydride and an epoxy resin are suitably employed as adhesives, casting resins, paints and the like.

The present curable resin composition employing the metal-containing composition as a main component can be cured in one step without addition of a catalyst to a metal-containing cured resin product into which metal-ionic bonds were introduced. Thus, a metal-containing cured resin having excellent properties which contains metal-ionic bonds in its molecule is obtained by curing the present resin composition which comprises a metal-containing resin compound represented by the general formula [1], a dibasic acid anhydride and an epoxy resin.

The metal-containing compound represented by the general formula [1] to be employed in the present invention is prepared by subjecting a glycol and a dibasic acid anhydride to mono-esterification reaction to obtain the corresponding mono-ester, and then neutralizing the resulting mono-ester with a divalent ion-forming agent such as a divalent metal oxide or hydroxide. The type of the glycol to be used in the above-mentioned reaction is not especially restricted. But, a glycol which is readily and economically available is preferred, such as ethylene glycol, propylene glycol, diethylene glycol and 1,4-butane diol. Typical examples of the above-mentioned dibasic acid anhydrides include phthalic anhydride, maleic anhydride, hexahydrophthalic anhydride, tetrachloro-phthalic anhydride, succinic anhydride and the like. The preferred anhydrides are those which are readily and economically available, such as phthalic anhydride. Examples of the divalent metals include the metals of alkali earth group and zinc group of the Periodic Table. Magnesium, calcium, zinc and the like are preferred in view of environmental pollution, etc.

The metal-containing compounds represented by the above-mentioned formula [1] are exemplified by divalent metal salts of mono(hydroxyethyl) phthalate, mono(hydroxypropyl) phthalate, or mono(hydroxybutyl) phthalate when R is O-phenylene group (residue of phthalic anhydride), and $R_1$ is ethylene, propylene or butylene group.

The dibasic acid anhydrides to be employed as a main component in the present curable resin composition are substantially the same as the above-exemplified anhydrides which are to be used in the reaction with glycols. The anhydride can be used alone, or two or more anhydrides can be concomitantly used as the main component in the present composition.

The epoxy resins to be employed in the present invention are those which can be used in conventional cured epoxy resins. The epoxy resin can be an epoxy resin having on the average two or more epoxy groups in the molecule, or mixtures of two or more of these epoxy resins, or mixtures of the epoxy resin with a monoepoxy compound.

Examples of the epoxy resin having two epoxy groups in the molecule include a bisphenol A-type epoxy resin, a glycidyl phthalate-type epoxy resin, a glycidyl hexahydrophthalate-type epoxy resin, a polyalkylene ether-type epoxy resin, an aliphatic diepoxy compound and the like. Examples of the epoxy resin having three or more epoxy groups in the molecule include tris-2,3-epoxypropyl-isocyanurate, a glycerin triether-type epoxy resin, a novolak-type epoxy resin and the like. The monoepoxy compounds include, for example, phenyl glycidyl ether, styrene oxide and the like. Especially, the cured epoxy resin products having excellent properties are obtained by employing a bisphenol A-type epoxy resin, a glycidyl phthalate-type epoxy resin and/or a glycidyl hexahydrophthalate-type epoxy resin.

As mentioned above, the novel metal-containing curable epoxy resin compositions of the present invention are obtained by incorporating the metal-containing compounds and the dibasic acid anhydrides into the epoxy resins. The metal-containing compound represented by the general formula [1] and the dibasic acid anhydride can be added to the epoxy resin in one step or separately. The amounts of each component contained in the metal-containing curable resin composition are not especially restricted, and the components can be employed to one another in optional proportions so far as the resulting composition can be cured to a cured resin products. By changing the proportions of the components in the curable resin composition, the corresponding cured resins having varieties of the amounts of ionic bonds, terminal groups, and degrees of crosslinking are obtained.

With respect to the ratio of the metal-containing compound represented by the general formula [1] to the dibasic acid anhydride, the degree of crosslinking in the resulting cured resin lowers as the ratio of the compound represented by the general formula [1] to the anhydride is decreased; and the degree of crosslinking rises as the ratio of the components is increased. On the other hand, the proportion of terminal hydroxyl groups in the resulting cured resin rises as the ratio of the compound represented by the general formula [1] and the dibasic acid anhydride to the epoxy resin is decreased; and the proportion of terminal carboxyl groups rises when the ratio is too much increased. The cured resins having very excellent properties are generally obtained when the molar ratio of the compound represented by the general formula [1] to the dibasic acid anhydride is in the range of from about 1:6 to about 1:40 and when the number of the acid anhydride groups is substantially the same as the number of the epoxy groups contained in the epoxy resin. In general, it is preferred to employ the components in the above-mentioned range of proportions in the practice of the present invention.

The metal-containing curable epoxy resin compositions in which the compounds having ionic bonds are contained according to the present invention possess excellent curing properties, and provide through curing reaction metal-containing cured epoxy resins having very excellent properties. The curing reaction of the present resin composition proceeds rapidly generally at a temperature of from about 40° to about 200° C. and preferably from about 60° to about 150° C., although some compositions according to the present invention are gradually cured even at room temperature.

The curing reaction is considered to proceed by way of the following predominant reactions. The addition reaction (esterification reaction) of the metal-containing compound represented by the formula [1] with the dibasic acid anhydride takes place to form ester linkages and terminal carboxyl groups. Further, addition reaction (esterification reaction) takes place between the resulting terminal carboxyl groups and unreacted epoxy groups and subsequently between the resulting reaction products and acid anhydride groups, which is considered to be alternately repeated to attain polyesterification. Thus, it is considered that the resulting cured resin necessarily has three-dimensional structure and metal-carboxylate linkages (ionic bonds) in its molecule.

In the curing reaction of the present resin composition, a conventional esterification catalyst may be used if so desired. It has been found, however, that the metal-carboxylate group present in the compound represented by the general formula [1], which is a main component in the curable resin composition, exhibits excellent catalytic action in the curing reaction. An important feature of the present invention resides in that the curing reaction proceeds smoothly without using a curing catalyst. Incidentally, when the number of epoxy groups is present in an excess to that of acid anhydride groups in the curable resin composition, polymerization of the epoxy groups also is considered to take place owing to the catalytic action of the metal-carboxylate group.

The metal-containing curable resin composition may be incorporated with suitable amounts of fillers, pigments, plasticizers, diluents and the like, if so desired.

The curable epoxy resin composition of the present invention provides a wide range of industrial application. For example, the resin composition is advantageously employed as casting resins, since the curing reaction of the resin composition proceeds rapidly at a temperature of preferably from 60° to 150° C. without especially adding a conventional esterification catalyst to produce a hard tough cured resin product which is insoluble and non-fusible. The resin composition is appropriately employed for bonding a steel plate to a steel plate and a glass plate to a glass plate and the like, since the resulting cured resin exhibits very excellent adhesive strength under tensile shear when the resin composition is used as adhesives.

The present invention is further illustrated by way of the following examples which are included merely to aid in the understanding of the present invention, and variations and modifications may be made without departing from the spirit and scope of the invention. Incidentally, "part" of each component which represents the proportion of formulation in the examples is based on weight.

Preparation of Ca Salt of Mono Hydroxypropyl Phthalate

Into a 1-liter four necked flask equipped with a stirrer, a thermometer, and a condenser, 228.3 g (3 moles) of propylene glycol and 2.29 g of N,N-dimethylbenzylamine as a catalyst were placed, and then 222.2 g (1.5 moles) of phthalic anhydride was added slowly with stirring at 70° C. over 2 hours.

After the addition, the mixture was stirred for an additional 1-2 hours at same temperature. The acid value after the reaction was 187 (calcd. 186).

When the mixture thus obtained was cooled by ice bath, white crystals separated. The crystals were collected by filtration, dried, and recrystallised with ethylacetate-ethylether; white powder of mono (β-hydroxy-n-propyl) phthalate was obtained. The product thus obtained had m.p. of 100°-103° C., and showed the following analytical data.

|  | C % | H % | OH value | ester value | acid value |
|---|---|---|---|---|---|
| Found | 58.90 | 5.40 | 253 | 249 | 250 |
| Calcd. | 58.92 | 5.40 | 250 | 250 | 250 |

To a reaction vessel, were placed 44.8 g of mono (β-hydroxy-n-propyl) phthalate obtained above, 50 g of acetone and 0.8 g of H₂O and the mixture was cooled. Then, to the mixture was gradually added 5.3 g of CaO at room temperature over 20-30 minutes.

Stirring was continued for 20 minutes at same temperature after the above addition, further reaction was continued at 60° C. for 3 hours.

The product separated as white precipitate. After the reaction, 50 g of acetone was added to the mixture; and product was filtered as white precipitate, washed with acetone several times, and dried.

The product thus obtained had m.p. of 178°-181° C., and showed following analytical data.

|  | C % | H % | Ca % | OH value | ester value |
|---|---|---|---|---|---|
| Found | 54.20 | 4.55 | 8.22 | 228 | 231 |
| Calcd. | 54.31 | 5.56 | 8.24 | 231 | 231 |

This product was identified by the above results and IR spectra as following:

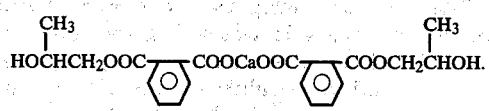

Preparation of Mg Salt of Mono Hydroxypropyl Phthalate

To a reaction vessel, were placed 44.8 g of mono(β-hydroxy-n-propyl) phthalate and 50 g of acetone, and was cooled.

Then, to the mixture was gradually added 4.0 g of MgO at room temperature over 20-30 min.

After the addition, stirring was continued for 20 min. at same temperature; next, further reaction was continued at 60° C. for 3 hr.

After the reaction, the mixture was filtered; and the solvent and produced water were distilled away from the filtrate, to obtain quantitatively slight yellow glassy Mg salt of mono(β-hydroxy-n-propyl) phthalate. The product thus obtained had 237 (calcd. 238) of OH value, 240 (calcd. 238) of ester value and 4.77 (calcd. 5.16%) of Mg content.

EXAMPLE 1

A metal-containing curable resin composition was prepared by incorporating 9.4 parts of Mg salt of mono (hydropropyl) phthalate and 29.6 parts of phthalic anhydride into 31.2 parts of diglycidyl ester of hexahydrophthalic acid (epoxy equivalent 148). Gelation of the resulting composition takes place at 120° C. in about 5 minutes. The resin composition was subjected to curing at 80° C. for 1 hour, at 120° C. for 1 hour, and then at 150° C. for 2 hours, to obtain a hard tough metal-containing cured product which is insoluble and non-fusible.

EXAMPLE 2

A metal-containing curable resin composition was prepared by incorporating 9.7 parts of Ca salt of mono (hydroxypropyl) phthalate and 30.8 parts of hexahydrophthalic anhydride into 35.3 parts of diglycidyl ether of bisphenol A (epoxy equivalent 179). The resulting composition was subjected to curing at 80° C. for 1 hour, at 100° C. for 1 hour, at 120° C. for 1 hour and then at 150° C. for 1 hour, to obtain a hard tough metal-containing cured product which is insoluble and non-fusible.

EXAMPLE 3

A metal-containing curable resin composition was prepared by incorporating 19.1 parts of Mg salt of mono (hydroxyethoxyethyl) phthalate and 29.6 parts of phthalic anhydride into 31.2 parts of diglycidyl ester of hexahydrophthalic acid (epoxy equivalent 148). Gelation of the resulting composition takes place at 120° C. in about 5 minutes. This composition was subjected to curing at 80° C. for 1 hour, at 100° C. for 1 hour, at 120° C. for 2 hours, and then at 150° C. for 1 hour, to obtain a hard tough metal-containing cured product which is insoluble and non-fusible.

EXAMPLE 4

A metal-containing curable resin composition was prepared by incorporating 11.7 parts of Ca salt of mono (hydrohexyl) hexahydrophthalate and 19.6 parts of maleic anhydride into 31.2 parts of diglycidyl ester of hexahydrophthalic acid (epoxy equivalent 148). Gelation of the resulting composition takes place at 120° C. in about 8 minutes. This resin composition was subjected to curing at 80° C. for 1.5 hours, at 120° C. for 2 hours and then at 150° C. for 1 hour, to obtain a hard tough metal-containing cured product which is insoluble and non-fusible.

EXAMPLE 5

A metal-containing curable resin composition was prepared by incorporating 9.7 parts of Ca salt of mono (hydroxypropyl) phthalate and 39.2 parts of maleic anhydride into 62.3 parts of diglycidyl ester of hexahydrophthalic acid (epoxy equivalent 148). Gelation of the resulting composition takes place at 120° C. within 10 minutes. The composition was interposed between two mild steel plates, and subjected to curing at 120° C. for 3 hours and then at 150° C. for 2 hours. The mild steel plates were bonded very strongly to each other. The bonding strength was determined in accordance with ASTM-D 1002-64 to show an adhesive strength under tensile shear of 197 Kg/cm².

EXAMPLE 6

A metal-containing curable resin composition was prepared by incorporating 10 parts of Mg salt of mono (hydroxybutyl) phthalate and 39.2 parts of maleic anhydride into 62.3 parts of diglycidyl ester of hexahydrophthalic acid (epoxy equivalent 148). Gelation of the resulting composition takes place at 120° C. within 10 minutes. The bonding strength between mild steel plates was determined in the same way as in Example 5 after curing at 120° C. for 3 hours and then at 150° C. for 2 hours, to obtain an adhesive strength under tensile shear of 191 Kg/cm².

EXAMPLE 7

A metal-containing curable resin composition was prepared by incorporating 9.7 parts of Ca salt of mono (hydroxypropyl) phthalate and 19.6 parts of maleic anhydride into 35.3 parts of diglycidyl ether of bisphenol A (epoxy equivalent 176). Gelation of the resulting composition takes place at 120° C. within 20 minutes. The bonding strength between mild steel plates was determined in the same way as in Example 5 after curing at 120° C. for 3 hours and then at 150° C. for 2 hours to obtain an adhesive strength under tensile shear of 219 Kg/cm².

EXAMPLE 8

A metal-containing curable resin composition was prepared by incorporating 9.6 parts of Mg salt of mono (hydroxyethoxyethyl) phthalate and 19.6 parts of maleic anhydride into 35.3 parts of diglycidyl ether of bisphenol A (epoxy equivalent 176). With the resulting composition, the bonding strength between mild steel plates was determined in the same way as in Example 5 after curing at 120° C. for 3 hours and then at 150° C. for 2 hours to obtain an adhesive strength under tensile shear of 208 Kg/cm².

EXAMPLE 9

A metal-containing curable resin composition was prepared by incorporating 9.6 parts of Mg salt of mono (hydroxyethoxyethyl) phthalate and 30.8 parts of hexahydrophthalic anhydride into 35.3 parts of diglycidyl ether of bisphenol A (epoxy equivalent 176). The resulting composition was subjected to curing at 80° C. for 1.5 hours at 120° C. for 2 hours and then at 150° C. for 1 hour to obtain a hard tough metal-containing cured product which is insoluble and non-fusible. With the curable resin composition, the bonding strength between mild steel plates was determined in the same way as in Example 5, after curing at 120° C. for 3 hours and then at 150° C. for 2 hours to obtain an adhesive strength under tensile shear of 148 Kg/cm².

EXAMPLE 10

A metal-containing curable resin composition was prepared by incorporating 5.0 parts of Mg salt of mono (hydroxybutyl) phthalate and 30.8 parts of hexahydrophthalic anhydride into 31.2 parts of diglycidyl ester of hexahydrophthalic acid (epoxy equivalent 148). Gelation of the resulting composition takes place at 120° C. within 20 minutes. The curable composition was interposed between two glass plates and subjected to curing at 120° C. for 2 hours and then at 150° C. for 1 hour. The glass plates were bonded very strongly to each other.

REFERENCE EXAMPLE 1

A curable resin composition was prepared by incorporating 5.3 parts of diethylene glycol (which was employed instead of a metal-containing dihydroxy compound represented by the general formula [1]) and 74.1 parts of phthalic anhydride into 88.1 parts of diglycidyl ether of bisphenol A (epoxy equivalent 179). Gelation time of the resulting composition was 5 hours at 120° C. The curing reaction did not proceed satisfactorily even after gelation, and only a brittle solid product was obtained even after curing at 120° C. for 10 hours.

From the results mentioned above, it is clear that metal-carboxylate groups contained in the present curable resin composition catalyzes the curing reaction of the metal-containing resin composition of the present invention. It should also be noted that the metal-containing curable resin compositions of the present invention exhibit very excellent bonding strength.

What is claimed is:

1. A metal-containing curable resin composition, which comprises an epoxy resin incorporated with (i) a dibasic acid anhydride, and (ii) a metal-containing compound having metal-ionic bond in its molecule and having the formula:

wherein, $R_1$ is the residue of a glycol, R is the residue of a dibasic acid anhydride remaining upon removal of the acid anhydride group, and M is divalent magnesium or calcium.

2. The metal-containing curable resin composition according to claim 1 in which R is the residue of phthalic anhydride.

3. The metal-containing curable resin composition according to claim 1 in which $R_1$ is the residue of a glycol selected from the group consisting of ethylene glycol, propylene glycol, and 1,4-butanediol.

4. The metal-containing curable resin composition according to claim 1 in which R is the residue of a dibasic acid anhydride selected from the group consisting of maleic anhydride, phthalic anhydride, and hexahydrophthalic anhydride.

5. The metal-containing curable resin composition according to claim 1 in which the epoxy resin is selected from the group consisting of a bisphenol A-type epoxy resin, a glycidyl phthalate-type epoxy resin, and a glycidyl hexahydrophthalate-type epoxy resin.

* * * * *